(12) United States Patent
Zeng et al.

US010180535B1

(10) Patent No.: US 10,180,535 B1
(45) Date of Patent: Jan. 15, 2019

(54) PLASTIC FRAME FOR BACKLIGHT MODULE AND BACKLIGHT MODULE, AND LIQUID CRYSTAL DISPLAY MODULE

(71) Applicant: Wuhan China Star Optoelectronics Technology Co., Ltd., Wuhan, Hubei (CN)

(72) Inventors: Jie Zeng, Hubei (CN); Liang Yue, Hubei (CN); Zhenzhen Zhang, Hubei (CN); Xiaoling Li, Hubei (CN); Yingbo Zheng, Hubei (CN); Xia Zhang, Hubei (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 0 days.

(21) Appl. No.: 15/577,917

(22) PCT Filed: Jul. 6, 2017

(86) PCT No.: PCT/CN2017/092117
§ 371 (c)(1),
(2) Date: Nov. 29, 2017

(30) Foreign Application Priority Data

Jun. 23, 2017 (CN) .......................... 2017 1 0488831

(51) Int. Cl.
*F21V 7/04* (2006.01)
*F21V 8/00* (2006.01)
*G02F 1/1333* (2006.01)

(52) U.S. Cl.
CPC ........... *G02B 6/009* (2013.01); *G02B 6/0088* (2013.01); *G02F 1/133308* (2013.01); *G02B 6/0055* (2013.01); *G02F 2001/133331* (2013.01)

(58) Field of Classification Search
CPC .. G02B 6/0068; G02B 6/0091; G02B 6/0083; G02B 6/0088; G02B 6/0021; G02F 1/133615; G02F 1/133308
See application file for complete search history.

(56) References Cited

U.S. PATENT DOCUMENTS

| | | | |
|---|---|---|---|
| 2014/0036543 A1* | 2/2014 | Hu ....................... | G02B 6/0083 362/631 |
| 2015/0077657 A1* | 3/2015 | Ma ....................... | H03K 17/96 349/12 |
| 2015/0219954 A1* | 8/2015 | Kubo ................ | G02F 1/133308 348/794 |
| 2017/0184910 A1* | 6/2017 | Lee ...................... | G02B 6/005 |

* cited by examiner

*Primary Examiner* — Evan Dzierzynski
(74) *Attorney, Agent, or Firm* — Mintz Levin Cohn Ferris Glovsky and Popeo, P.C.; Kongsik Kim

(57) ABSTRACT

The present disclosure provides a plastic frame for a backlight module. The plastic frame includes a glass cover plate, and edge bars including a first edge bar provided with an LED placing groove for insertion of lamp beads of the light bars and a second edge bar, that are provided at two opposite sides of the glass cover plate close to an edge, respectively, wherein the LED placing groove passes through one side of the first edge bar being opposite to the second edge bar and one side of the first edge bar deviating away from the second edge bar. The present disclosure also provides a backlight module and a liquid crystal display module.

18 Claims, 2 Drawing Sheets

PLASTIC FRAME FOR BACKLIGHT MODULE AND BACKLIGHT MODULE, AND LIQUID CRYSTAL DISPLAY MODULE

CROSS-REFERENCES TO RELATED APPLICATIONS

This application is a U.S. national phase application, pursuant to 35 U.S.C. § 371, of PCT/CN2017/092117, filed Jul. 6, 2017, designating the United States, which claims priority to Chinese Application No. 201710488831.1, filed Jun. 23, 2017. The entire contents of the aforementioned patent applications are incorporated herein by this reference.

TECHNICAL FIELD

The present disclosure relates to a display panel technology, particularly, to a plastic frame for a backlight module and a backlight module, and a liquid crystal display module.

BACKGROUND ART

At present, a liquid crystal display device, as a display component of an electronic device, has been widely applied in various electronic products, and a backlight module is an important component in the liquid crystal display device.

Generally, a small-and-medium-sized backlight module (which is different from a large-sized one) includes: a plastic frame, a reflective sheet, a light guide plate, an optical film set, a light bar and a light-shielding tape (a □-shaped tape). A flexible circuit board of the light bar is fixed on the plastic frame via the light-shielding tape. With the development of narrow bezel technology of the liquid crystal display device, a huge change occurs in the connection between a panel and a backlight module. Fixing a panel and a plastic frame using a □-shaped tape traditionally is changed into fixing a panel and a backboard module by dispensing. However, by this way, the panel and the backlight module are still fixed externally, problems such as unqualified sizes of glue points, wire drawing, dip dyeing of glue, and easy to fall due to poor solidification strength will appear during the dispensing, and a weak fixation is thereby caused. In addition, it is inconvenient for disassembling in reworking.

SUMMARY

In order to overcome defects in the prior art, the present disclosure provides a plastic frame for a backlight module and a backlight module, and a liquid crystal display module, which can further reduce a width of a frame and ensure firmer connection between the panel and the backlight module.

The present disclosure provides a plastic frame for a backlight module. The plastic frame may include a glass cover plate, and edge bars including a first edge bar provided with a light emitting diode (LED) placing groove for insertion of lamp beads of a light bar and a second edge bar, that are provided at two opposite sides of the glass cover plate close to an edge, respectively, wherein the LED placing groove passes through one side of the first edge bar being opposite to the second edge bar and one side of the first edge bar deviating away from the second edge bar.

Further, the LED placing groove may be composed of a plurality of slots having a shape and dimensions well-matched with those of the lamp beads, the slots being provided to be spaced apart from each other.

Further, the second edge bar may be provided with a cutout dividing the second edge bar into disconnected second sub-edge bars.

Further, the glass cover plate and the edge bars may be an integrally molded structure.

The present disclosure also provides a backlight module including a plastic frame, a reflective sheet fixed on one side of the plastic frame through a double-sided tape, a light guide plate provided in the plastic frame located on the reflective sheet, an optical film set provided in the plastic frame and located on the light guide plate, and a light bar fixed on the plastic frame and being opposite to a side of the light guide plate.

The plastic frame may include a glass cover plate, and edge bars including a first edge bar provided with an LED placing groove for insertion of lamp beads of the light bar and a second edge bar, that are provided at two opposite sides of the glass cover plate close to an edge, respectively, wherein the LED placing groove passes through one side of the first edge bar being opposite to the second edge bar and one side of the first edge bar deviating from the second edge bar, the lamp beads are inserted into the LED placing groove from an external side of the first edge bar to make a light emitting surface of the lamp beads be opposite to a side of the light guide plate, and a flexible circuit board is fixed on one side of the first edge bar deviating from the second edge bar through a double-sided tape.

The reflective sheet may be fixed on sides of the first and second edge bars deviating from the glass cover plate through a double-sided tape, and when the light guide plate and the optical film set are assembled in sequence, a placing cavity for placing the panel is formed between the optical film set and the glass cover plate.

Both sides of the reflective sheet, the light guide plate and the optical film set perpendicular to the edge bars may be all packaged through a one-sided light-shielding tape.

Further, the LED placing groove may be composed of a plurality of slots having a shape and dimensions well-matched with those of the lamp beads, the slots is provided to be spaced apart from each other, and the lamp beads are placed in the slots, respectively.

Further, the second edge bar may be provided with a cutout dividing the second edge bar into disconnected second sub-edge bars.

Further, the glass cover plate and the edge bars may be an integrally molded structure.

The present disclosure further provides a liquid crystal display module including a panel and the backlight module, the panel may be placed in the placing cavity, and fixed by fitting with an edge of the optical film set mutually through a light-shielding tape.

Compared with the prior art, the present disclosure further reduces the width of the frame by replacing a □-shaped plastic frame in the prior art with a plastic frame composed of a glass cover plate and edge bars provided on the glass cover plate; the backlight module may have a placing cavity accommodating a panel formed therein, the panel may be fixed with the optical film set through a light-shielding tape, and the panel and optical components in the backlight module may be all provided in the plastic frame, with no need to consider the problem of fitting between the panel and the backlight assembly, such that the panel and the backlight module may be more firmly connected.

DETAILED DESCRIPTION OF EXEMPLARY EMBODIMENTS

Below, the present disclosure is further explained in detail in conjunction with the figures and an embodiment.

Figure 1:
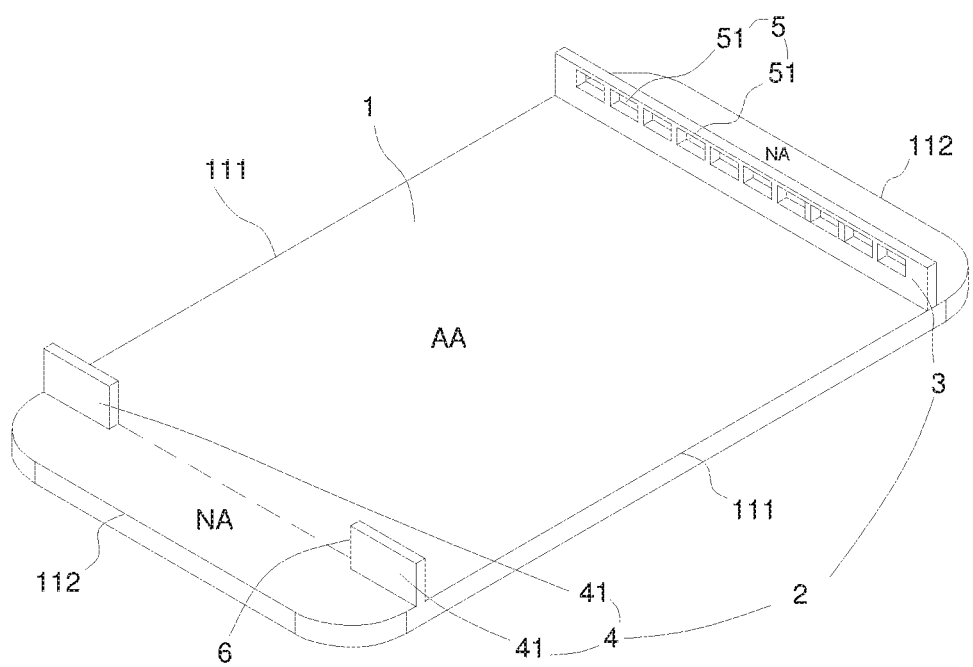
FIG. 1 is a structure diagram of a plastic frame of the present disclosure for a backlight module.

As illustrated in FIG. 1, a plastic frame of the present disclosure for a backlight module includes a glass cover plate 1 and edge bars 2. The glass cover plate 1 has a visible region (AA) and a non-visible region (NA) located outside of the visible region AA, and in particular, the non-visible region NA is provided at two opposite sides of the glass cover plate 1, and the edge bars 2 are located at a boundary between the non-visible region NA and the visible region AA. The glass cover plate 1 of the present disclosure has first edges 111 provided oppositely, and two edges 112 perpendicular to the first edges 111, a length of the first edge 111 being longer than that of the second edge 112, and the non-visible region NA is provided at sides of two edges 112. The edge bars 2 include a first edge bar 3 provided with a light emitting diode (LED) placing groove 5 for insertion of lamp beads of a light bar and a second edge bar 4, that are provided at two opposite sides of the glass cover plate 1 close to an edge, respectively, wherein the LED placing groove 5 passes through one side of the first edge bar 3 being opposite to the second edge bar 4 and one side of the first edge bar 3 deviating away from the second edge bar 4, and in particular, the first edge bar 3 and the second edge bar 4 are provided at sides of the second edges 112 of the glass cover plate 1, respectively.

Through the above structure, the plastic frame is changed from the original "☐" shape to only being provided at the boundary between the non-visible region NA and the visible region AA, such that a frame body of the plastic frame does not exist at two other sides, which further reduces the width of the frame.

As illustrated in FIG. 1, the LED placing groove 5 is composed of a plurality of slots 51 having a shape and dimensions well-matched with those of the lamp beads, the slots being provided to be spaced apart from each other, thus, the light sources are more concentrated and will not affect each other.

As illustrated in FIG. 1, the second edge bar 4 is provided with a cutout 6 dividing the second edge bar 4 into disconnected second sub-edge bars 41 and being used for placing a flexible circuit board of the panel, and in particular, the second sub-edge bars 41 are symmetrically provided and have equal lengths.

In the present disclosure, the glass cover plate 1 and the edge bars 2 are an integrally molded structure.

Figure 2:
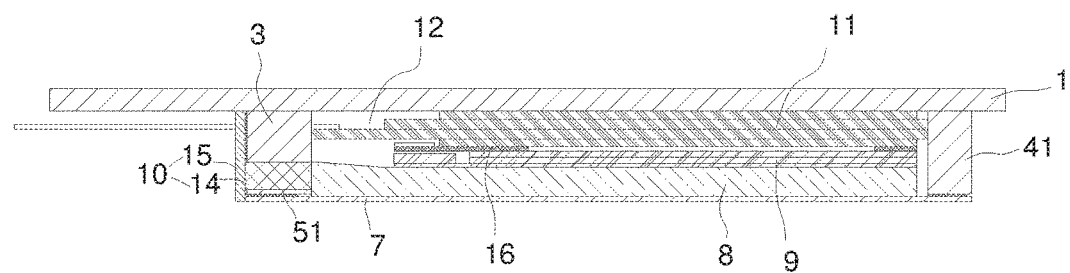
FIG. 2 is diagram 1 of assembly of a backlight module of the present disclosure and a display panel.
Figure 3:
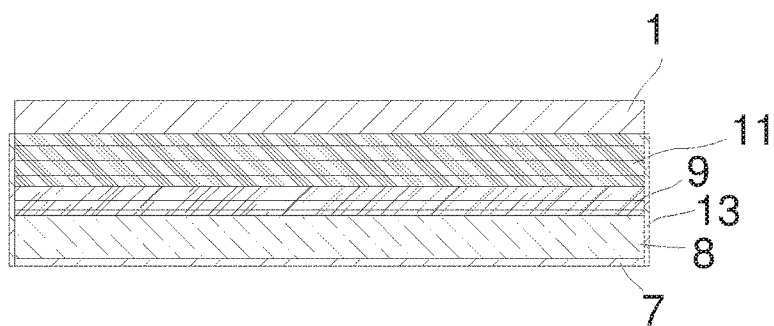
FIG. 3 is diagram 2 of assembly of a backlight module of the present disclosure and a display panel.

As illustrated in FIGS. 2 and 3, the backlight module of the present disclosure includes a plastic frame, a reflective sheet 7 fixed on one side of the plastic frame through a double-sided tape, a light guide plate 8 provided in the plastic frame and located on the reflective sheet 7, an optical film set 9 provided in the plastic frame and located on the light guide plate 8, and a light bar 10 fixed on the plastic frame and being opposite to a side of the light guide plate 8.

The plastic frame includes a glass cover plate 1 and edge bars 2. The glass cover plate 1 has a visible region (AA) and a non-visible region (NA) located outside of the visible region AA, and in particular, the non-visible region NA is provided at two opposite sides of the glass cover plate 1, and the edge bars 2 are located at a boundary between the non-visible region NA and the visible region AA.

The glass cover plate 1 of the present disclosure has first edges 111 provided oppositely, and two edges 112 perpendicular to the first edges 111, a length of the first edge 111 being longer than that of the second edge 112, and the non-visible region NA is provided at sides of two edges 112.

The edge bars 2 include a first edge bar 3 provided with an LED placing groove 5 for insertion of lamp beads of the light bar and a second edge bar 4, that are provided at two opposite sides of the glass cover plate 1 close to an edge, respectively, wherein the LED placing groove 5 passes through one side of the first edge bar 3 being opposite to the second edge bar 4 and one side of the first edge bar 3 deviating from the second edge bar 4, the lamp beads 14 of the light bar 10 are inserted into the LED placing groove 5 from an external side of the first edge bar 3 to make a light emitting surface of the lamp beads be opposite to a side of the light guide plate 8, a flexible circuit board 15 of the light bar 10 is pasted on the one side of the first edge bar 3 deviating from the second edge bar 4 through a double-sided tape, the light bar 10 being placed independently without combining with other optical components is more convenient for reworking of the whole backlight module, and in particular, the first edge bar 3 and the second edge bar 4 are provided at sides of the second edges 112 of the glass cover plate 1, respectively.

The reflective sheet 7 is fixed on sides of the first and second edge bars 3 and 4 deviating from the glass cover plate 1 through a double-sided tape, and when the light guide plate 8 and the optical film set 9 are assembled in sequence, a placing cavity 12 for placing the panel is formed between the optical film set 9 and the glass cover plate 1.

Both sides of the reflective sheet 7, the light guide plate 8 and the optical film set 9 perpendicular to the edge bars 2 are all packaged through a one-sided light-shielding tape 13, so as to package the optical components and prevent light leakage; since a one-sided light-shielding tape 13 is thinner than a backboard, and with the adoption of the above structure, the backboard is no longer needed to be provided to fix the panel, thus, designing requirements on narrow bezel of the liquid crystal display module can be further implemented and a number of components is reduced.

A side of the light guide plate 8 opposite to the lamp beads 14 forms a light incident surface, and a light exit surface may be formed of two side surfaces of the light guide plate 8 provided perpendicular with the light incident surface or a side surface of the light guide plate 8 opposite to the optical film set 9.

As illustrated in FIG. 1, the LED placing groove 5 in the backlight module of the present disclosure is composed of a plurality of slots 51 having a shape and dimensions well-matched with those of the lamp beads 14, the slots 51 being provided to be spaced apart from each other, thus, the light sources are more concentrated and will not affect each other. A space provided between slots 51 is determined according to a space between the lamp beads 14 on the light bar 10.

As illustrated in FIG. 1, the second edge bar 4 in the backlight module of the present disclosure is provided with a cutout 6 dividing the second edge bar 4 into disconnected second sub-edge bars 41 and being used for placing a flexible circuit board of the panel, and in particular, the second sub-edge bars 41 are symmetrically provided and have equal lengths.

In the backlight module of the present disclosure, the glass cover plate 1 and the edge bars 2 are an integrally molded structure.

As illustrated in FIGS. 2 and 3, the liquid crystal display module of the present disclosure includes a panel 11 and the above backlight module. Since the structure of the backlight module has been specifically depicted in the previous part, it will not be repeated here. In the liquid crystal display module, the panel 11 is placed in the placing cavity 12 and fixed by fitting with an edge of the optical film set 9 mutually through a light-shielding tape. Providing, as required in the prior art, a backboard for connection and fixation with the panel 11 is changed into providing the panel in the backlight module; in this way, there is no need to consider the problem of fitting between the panel and the backlight assembly, such that the panel and the backlight module are more firmly connected, and the flexible circuit board of the panel 11 extends through the cutout 16 and connects with other components, such as a mainboard and the like.

Although the present disclosure has been illustrated and described with reference to special exemplary embodiments, those skilled in the art will understand that various changes in form and detail may be made therein without departing from the spirit and scope of the disclosure as defined by the claims and their equivalents.

What is claimed is:

1. A plastic frame for a backlight module, comprising:
   a glass cover plate; and
   edge bars comprising a first edge bar provided with an LED placing groove for insertion of lamp beads of a light bar and a second edge bar, that are provided at two opposite sides of the glass cover plate close to an edge, respectively, the LED placing groove passing through one side of the first edge bar being opposite to the second edge bar and one side of the first edge bar deviating from the second edge bar.

2. The plastic frame for a backlight module of claim 1, wherein the LED placing groove is composed of a plurality of slots having a shape and dimensions well-matched with those of the lamp beads, and the slots are provided to be spaced apart from each other.

3. The plastic frame for a backlight module of claim 1, wherein the second edge bar is provided with a cutout dividing the second edge bar into disconnected second sub-edge bars.

4. The plastic frame for a backlight module of claim 1, wherein the glass cover plate and the edge bars are an integrally molded structure.

5. The plastic frame for a backlight module of claim 2, wherein the glass cover plate and the edge bars are an integrally molded structure.

6. The plastic frame for a backlight module of claim 3, wherein the glass cover plate and the edge bars are an integrally molded structure.

7. A backlight module, comprising:
   a plastic frame;
   a reflective sheet fixed on one side of the plastic frame through a double-sided tape;
   a light guide plate provided in the plastic frame and located on the reflective sheet;
   an optical film set provided in the plastic frame and located on the light guide plate; and
   a light bar fixed on the plastic frame and being opposite to a side of the light guide plate,
   wherein the plastic frame includes a glass cover plate, and edge bars including a first edge bar provided with an LED placing groove for insertion of lamp beads of the light bar and a second edge bar, that are provided at two opposite sides of the glass cover plate close to an edge, respectively, wherein the LED placing groove passes through one side of the first edge bar being opposite to the second edge bar and one side of the first edge bar deviating from the second edge bar, the lamp beads are inserted into the LED placing groove from an external side of the first edge bar to make a light emitting surface of the lamp beads be opposite to a side of the light guide plate, and a flexible circuit board is fixed on one side of the first edge bar deviating from the second edge bar through a double-sided tape;
   the reflective sheet is fixed on sides of the first and second edge bars deviating from the glass cover plate through a double-sided tape, and when the light guide plate and the optical film set are assembled in sequence, a placing cavity for placing the panel is formed between the optical film set and the glass cover plate; and
   both sides of the reflective sheet, the light guide plate and the optical film set perpendicular to the edge bars are all packaged through a one-sided light-shielding tape.

8. The backlight module of claim 7, wherein the LED placing groove is composed of a plurality of slots having a shape and dimensions well-matched with those of the lamp beads, and the slots are provided to be spaced apart from each other and the lamp beads are placed in the slots, respectively.

9. The backlight module of claim 7, wherein the second edge bar is provided with a cutout dividing the second edge bar into disconnected second sub-edge bars.

10. The backlight module of claim 7, wherein the glass cover plate and the edge bars are an integrally molded structure.

11. The backlight module of claim 8, wherein the glass cover plate and the edge bars are an integrally molded structure.

12. The backlight module of claim 9, wherein the glass cover plate and the edge bars are an integrally molded structure.

13. A liquid crystal display module, comprising:
    a panel; and
    a backlight module, the backlight module comprising:
      a plastic frame;
      a reflective sheet fixed on one side of the plastic frame through a double-sided tape;
      a light guide plate provided in the plastic frame and located on the reflective sheet;
      an optical film set provided in the plastic frame and located on the light guide plate; and
      a light bar fixed on the plastic frame and being opposite to a side of the light guide plate,
    wherein the plastic frame includes a glass cover plate, and edge bars including a first edge bar provided with an LED placing groove for insertion of lamp beads of the light bar and a second edge bar, that are provided at two opposite sides of the glass cover plate close to an edge, respectively, wherein the LED placing groove passes through one side of the first edge bar being opposite to and deviating from the second edge bar, the lamp beads are inserted into the LED placing groove from an external side of the first edge bar to make a light emitting surface of the lamp beads be opposite to a side of the light guide plate, and a flexible circuit board is fixed on one side of the first edge bar deviating from the second edge bar through a double-sided tape;
    the reflective sheet is fixed on sides of the first and second edge bars deviating from the glass cover plate through a double-sided tape, and when the light guide plate and the optical film set are assembled in sequence, a placing cavity for placing the panel is formed between the optical film set and the glass cover plate;

both sides of the reflective sheet, the light guide plate and the optical film set perpendicular to the edge bars are all packaged through a one-sided light-shielding tape; and the panel is placed in the placing cavity and fixed by fitting with an edge of the optical film set mutually through a light-shielding tape.

14. The liquid crystal display module of claim 13, wherein the LED placing groove is composed of a plurality of slots having a shape and dimensions well-matched with those of the lamp beads, the slots are provided to be spaced apart from each other and the lamp beads are placed in the slots, respectively.

15. The liquid crystal display module of claim 13, wherein the second edge bar is provided with a cutout dividing the second edge bar into disconnected second sub-edge bars.

16. The liquid crystal display module of claim 13, wherein the glass cover plate and the edge bars are an integrally molded structure.

17. The liquid crystal display module of claim 14, wherein the glass cover plate and the edge bars are an integrally molded structure.

18. The liquid crystal display module of claim 15, wherein the glass cover plate and the edge bars are an integrally molded structure.

* * * * *